(12) United States Patent
Kahle et al.

(10) Patent No.: US 7,296,481 B2
(45) Date of Patent: Nov. 20, 2007

(54) CRUCIFORM SPRING ELEMENT

(75) Inventors: Jens Kahle, Dreieich (DE); Robert Weinand, Darmstadt (DE)

(73) Assignee: Schenck Process GmbH, Darmstadt (DE)

( * ) Notice: Subject to any disclaimer, the term of this patent is extended or adjusted under 35 U.S.C. 154(b) by 75 days.

(21) Appl. No.: 10/563,037

(22) PCT Filed: Jul. 7, 2004

(86) PCT No.: PCT/EP2004/007431

§ 371 (c)(1),
(2), (4) Date: Dec. 30, 2005

(87) PCT Pub. No.: WO2005/005934

PCT Pub. Date: Jan. 20, 2005

(65) Prior Publication Data

US 2006/0169053 A1 Aug. 3, 2006

(30) Foreign Application Priority Data

Jul. 8, 2003 (DE) ................................. 103 30 947

(51) Int. Cl.
*G01N 3/02* (2006.01)
(52) U.S. Cl. ................................. 73/856; 73/862; 73/42
(58) Field of Classification Search ................... 73/856
See application file for complete search history.

(56) References Cited

U.S. PATENT DOCUMENTS

| | | | | |
|---|---|---|---|---|
| 3,577,101 A | * | 5/1971 | Pege | .......................... 331/154 |
| 3,776,047 A | * | 12/1973 | Rothenbuhler et al. | ......... 74/70 |
| 3,824,674 A | * | 7/1974 | Inoyama et al. | ......... 29/407.05 |
| 4,057,283 A | * | 11/1977 | Barnett | ....................... 296/173 |
| 4,261,211 A | | 4/1981 | Haberland | |
| 4,552,028 A | * | 11/1985 | Burckhardt et al. | ... 73/862.041 |
| 4,574,896 A | | 3/1986 | Friedrich | |
| 4,712,431 A | * | 12/1987 | Hatamura | ............... 73/862.042 |
| 4,717,282 A | * | 1/1988 | Anderson | ................... 404/122 |
| 4,821,581 A | | 4/1989 | Jost | |
| 5,191,802 A | | 3/1993 | Fassbinder | |
| 5,343,581 A | * | 9/1994 | Bartley et al. | .................. 5/611 |

(Continued)

FOREIGN PATENT DOCUMENTS

DE    33 46 145    7/1985

(Continued)

*Primary Examiner*—Max Noori
(74) *Attorney, Agent, or Firm*—W. F. Fasse; W. G. Fasse

(57) ABSTRACT

The invention relates to a cross spring element, as it is preferably arranged in measuring apparatuses for the measurement of the mass flow of bulk materials according to the Coriolis principle. In that regard, two bearing elements (1, 2) that are rotatable relative to one another are provided in the measuring branch and comprise at least four mutually orthogonally crossing leaf spring elements (3, 4, 5, 6), which connect both of the bearing elements (1, 2) with one another. In that regard, the mutually crossing leaf spring elements (3, 4; 5, 6) of one radial direction (8) are arranged at least pair-wise and cross themselves on the rotation axis (7). The ends of each leaf spring pair (3, 4; 5, 6) in that regard are secured on one side respectively on different bearing elements (1, 2) so that they transmit radial compressive and tensile loads in each direction (8) simultaneously.

7 Claims, 1 Drawing Sheet

U.S. PATENT DOCUMENTS

Figure 1:
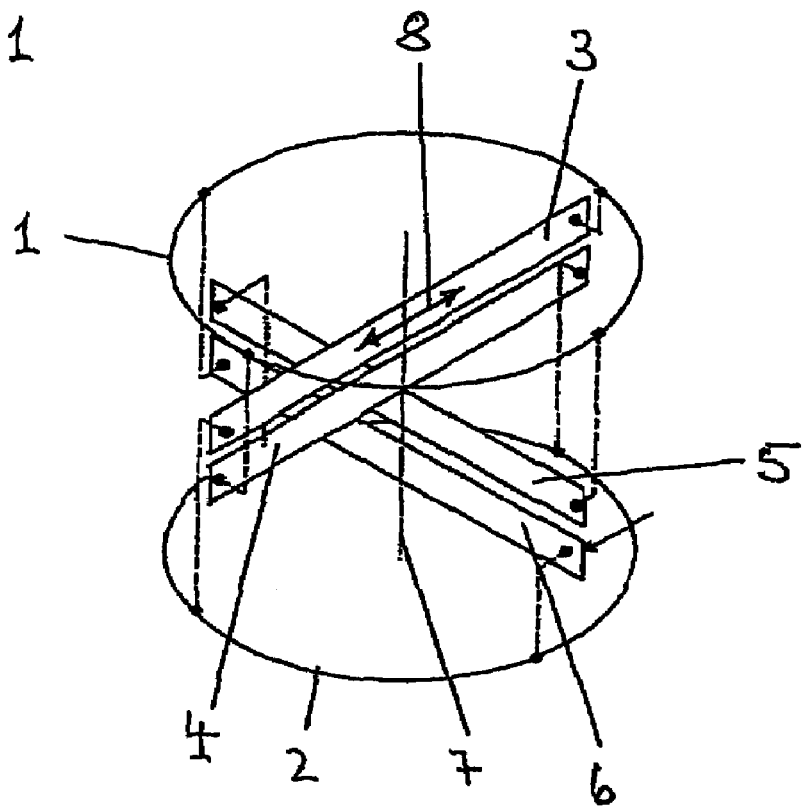

| | | |
|---|---|---|
| 5,353,647 A | 10/1994 | Toerner |
| 5,663,550 A | 9/1997 | Peng |
| 5,889,214 A * | 3/1999 | Kang et al. ............ 73/862.044 |
| 6,237,409 B1 | 5/2001 | Labschies |
| 6,368,330 B1 * | 4/2002 | Hynes et al. ................ 606/130 |
| 6,705,171 B1 | 3/2004 | Toerner |
| 6,964,423 B1 * | 11/2005 | Chieh et al. ............. 280/79.11 |

FOREIGN PATENT DOCUMENTS

| | | |
|---|---|---|
| DE | 36 33 694 | 4/1988 |
| DE | 42 13 308 | 10/1993 |
| DE | 43 26 530 | 10/1994 |
| DE | 195 04 992 | 3/1996 |
| DE | 198 49 719 | 5/2000 |
| DE | 199 05 951 | 8/2000 |
| DE | 101 34 205 | 1/2003 |
| EP | 0 421 111 | 4/1991 |
| EP | 0 474 121 | 3/1992 |
| EP | 0 590 187 | 4/1994 |
| EP | 0 671 698 | 9/1995 |
| JP | 2001-119089 | 4/2001 |
| WO | WO 00/47955 | 8/2000 |

* cited by examiner

CRUCIFORM SPRING ELEMENT

The invention relates to a cruciform or cross spring element according to the preamble of the patent claim 1.

For the exact measurement of rotational moments or torques it is generally necessary to support two components rotatably relative to one another. Especially in connection with small torques, it is decisive for the measuring accuracy, to provide the most friction-free possible bearing support. Relatively small torques are especially used in the measurement of the mass flow according to the Coriolis measuring principle. In such measuring devices, a motor is driven with a constant rotational speed, which sets into rotation an impeller wheel, onto which the material flow is deposited and radially deflected. The drive torque is measured through a torque measuring arrangement, and the magnitude of the drive torque is proportional to the mass flow.

A measuring apparatus for the continuous weight determination of material flows is previously known from the DE-OS 33 46 145. In this measuring apparatus, the drive torque of the motor is measured, whereby the motor is pivotally or pendulously suspended and is braced or supported on a force transducer or pick-up that is connected with the housing. With consideration of the lever arm, the detected force is calculated-over or converted into a torque, which is exactly proportional to the mass throughput. In this apparatus, the swingably suspended motor is guided relative to the stationary housing in ball bearings, which can falsify the torque measurement due to their friction. This also cannot be previously determined, because during the loaded operation through a motor supported on one side, partially differing or varying bearing frictions arise, which then falsify the measurement result.

From the EP 0 474 121 B1, similarly an apparatus for the measurement of the mass flow according to the Coriolis principle is known, in which the drive torque is determined by a measuring transmission that is to substantially compensate these bearing friction forces. For that purpose, the driven measuring shaft of the impeller wheel is guided in a roller bearing, of which the outer ring or race is supported in a further roller bearing. In that regard, the outer ring or race of the second roller bearing is provided with an additional drive, which lets the second roller bearing run or rotate at least with the synchronous rotational speed of the measuring shaft. A non-linear friction influence on the torque measurement is not completely preventable, because for differing drive torques, between the two roller bearings, a relative motion in the rotation direction arises, and necessitates a so-called breakdown or separation moment.

From the WO 00/47955, a torque measuring apparatus for a measuring apparatus of the mass flow according to the Coriolis measuring principle is known, which transmits the drive torque via a rotation bearing element, which includes a friction-free cruciform or cross spring element. This cross spring element consists of two orthogonally crossing leaf springs, which connect two bearing elements with one another. One of the bearing elements is a vertically downwardly oriented bearing sleeve, in the hollow space of which a vertically upwardly oriented cylinder as a second bearing element is guided. In the axial direction, both bearing elements are rotatably supported by a ball, of which the friction is negligible. For the radial bearing support, the leaf springs are arranged perpendicularly to the rotation axis, and are secured with their one end on the bearing sleeve and with the other end on the lower cylinder. In the axial direction to the rotation axis, the mutually crossing leaf springs are provided spaced apart next to one another and are guided through a recess in the lower cylinder, which enables a small rotational motion of both of the bearing elements relative to one another. This rotational bearing is embodied substantially friction-free and flexurally soft in the rotation direction and flexurally stiff in the radial direction. Such a cross spring element, however, has the disadvantage, especially in connection with a rotating radial load, that the danger exists, that the spring characteristic changes in a sudden jump or step manner depending on the sign of the stress or tension in the leaf springs, which leads to large buckling loads, and causes an undesired change of the spring rate or coefficient in the rotation direction.

Therefore, it is the object or task of the invention to further develop such a spring element, so that under a radial load it is flexurally soft in the rotation direction and is flexurally hard as much as possible in the radial direction, and of which the spring rate or coefficient in the rotation direction is substantially independent of the radial load.

This object is achieved by the invention recited in the patent claim 1. Further developments and advantageous example embodiments of the invention are recited in the dependent claims.

The invention has the advantage, due to the pair-wise arrangement of the leaf spring elements, that these can be laid out particularly flat in the radial direction and thereby very elastic in the bending direction. Advantageously thereby, the hysteresis of the leaf spring elements is kept small, even though this cross spring element withstands high radial loads and hardly any buckling danger exists.

A cross spring element that is elastic in such a manner furthermore has the advantage, that it is excellently suitable for force or torque measurement in connection with pendulously or swingably suspended drive motors, because in connection with these, only small rotational motions need to be transmitted. As these bearings also can be arranged in the measuring branch, it is possible with such a simple cross spring element to achieve a friction-free bearing support, which has no falsifying influence on the measurement result.

The invention furthermore also has the advantage that such a cross spring element operates substantially wear-free, and therefore requires only little maintenance effort. Namely, due to the connection of the bearing elements through at least two leaf spring pairs, a point-form loading in the bearing elements is avoided, which especially lead to increased wear and friction in connection with the small rotational motions and vibrating radial loads in ball bearings.

Moreover, the invention still further has the advantage that it comprises a high zero point constancy in the unloaded or idling running operation even with a rotationally running cross spring element. Especially also then, when it comprises radial drive apparatuses, because hardly any radial deflections that can lead to measuring signal fluctuations arise due to the running or rotating cross spring elements that are always uniformly loaded under tension and compression. Additionally, with such a cross spring element, simultaneously a highly exact force or torque measurement is advantageously possible even in connection with strong temperature fluctuations. Namely, due to the alternating securement or attachment of the leaf spring elements on both of the bearing elements, especially thermal expansion effects as well as thermal stresses will compensate one another or even each other out symmetrically to the rotation axis, so that they have only a negligible influence on the measuring apparatus.

The invention will be described in further detail in connection with an example embodiment, which is illustrated in the drawing.

Figure 2:
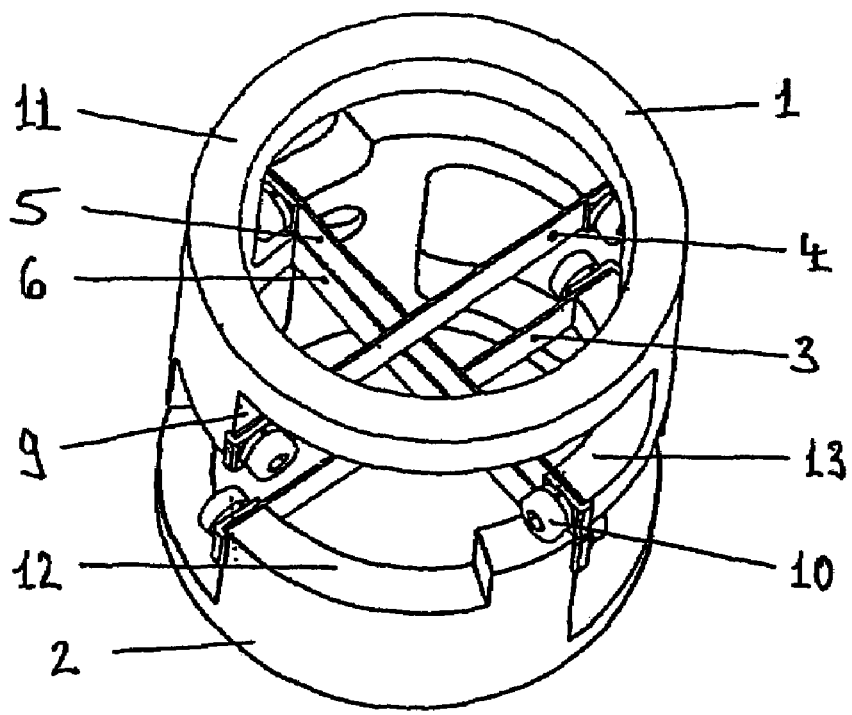

It is shown by:

FIG. 1 a schematic illustration of the principle arrangement of a cross spring element, and FIG. 2 a constructive embodiment of a cross spring element.

In FIG. 1 of the drawing, a cross spring element for a mass flow measuring apparatus according to the Coriolis principle is schematically illustrated. The cross spring element consists of four pair-wise crossing leaf springs 3, 4, 5, 6, which are secured on two ring-shaped bearing elements 1, 2.

The cross spring joint is especially provided to connect a drive axis of an impeller wheel that is supported in a non-illustrated sleeve, with a swinging or pendulously supported force measuring apparatus. Such an apparatus is disclosed in the patent application filed on Nov. 13, 2002 in the German Patent and Trademark Office under the file number 102 53 078.5-52. In that regard, the force measuring apparatus is supported by an intermediate transmission on a drive motor. For that purpose, both bearing elements 1, 2 are respectively connected with a toothed gear wheel, which rotate with two similar-type intermediate toothed gear wheels in a meshing manner, and which are synchronously driven by a drive motor. In that regard, one of the intermediate toothed gear wheels is connected with a lever arm, which is supported on a force measuring cell or load cell, and through which the drive moment is measured. In connection with drive moment fluctuations, a slip or a relative motion arises between both of the intermediate toothed gear wheels on the bearing elements, whereby the rotational angle of the slip or relative motion is proportional to the mass flow. These rotational angles are very small even in connection with larger lever arm ratios, and generally amount to no more than 5°, and shall be as friction-free as possible in connection with a miss-rotation or twisting of the bearing elements, because this cross spring element is located directly in the measuring branch.

Due to the small Coriolis forces relative to other forces in this drive branch, each bearing friction would weaken the measurement signal and would also falsify the measurement signal due to non-linear effects. Since the cross spring element is radially driven by two meshing toothed gear wheels, radial forces that are not inconsiderable arise in the transmission of the drive moment, whereby these radial forces must be taken up by the rotating spring element. In connection with a radial deflection, this would directly have an influence on the measured value, because the torque or rotational moment to be determined is given by a prescribed length of the lever arm that is supported on the force measuring cell or load cell. In connection with a lateral deflection, this lever arm length would change, whereby a measurement error arises.

In connection with such a radial force loading, especially in connection with rotating cross spring elements, depending on the rotation angle position of the leaf springs 3, 4, 5, 6, both a tensile as well as a compressive loading will arise in the axial direction of the leaf springs. Especially for the compressive loadings, in order to prevent buckling motions in the leaf springs 3, 4, 5, 6, these would have to be dimensioned so large that thereby the flexural softness thereof in the rotational direction would suffer.

The inventive cross spring element is therefore embodied so that, for each angular position, it is flexurally as soft as possible in the rotational direction and flexurally hard overall in the radial direction, without the existence of the danger of a radial deflection, even if larger radial force loads arise. This is achieved by the invention preferably in that the crossing leaf springs 3, 4, 5, 6 of one radial direction 8 are arranged pair-wise, whereby the ends respectively are secured on different bearing elements 1, 2. Thus, the first 3 and second leaf spring 4 in the upper portion of the drawing is arranged perpendicularly or transversely to the rotation axis 7. In that regard, both are provided parallel next to one another in the axial direction to the rotation axis 7, whereby the first leaf spring 3 is secured with its one end on the upper ring-shaped bearing element 1 and with its other end on the lower ring-shaped bearing element 2. On the other hand, the second leaf spring 4 of these pair-wise arranged leaf springs is secured with its ends reversed or the opposite way on the bearing elements 1, 2, so that its left end region is connected with the upper ring-shaped bearing element 1 and its right end region is connected with the lower ring-shaped bearing element 2. Both of these leaf springs 3, 4 are crossed orthogonally by a further leaf spring pair 5, 6 on the rotation axis 7 in the lower region of the drawing. In that regard, however, all leaf springs 3, 4, 5, 6 are arranged spaced apart in the axial direction to the rotation axis 7, whereby the lower leaf spring pair 5, 6 extends parallel next to one another in a direction perpendicular or transverse to the rotation axis 7. In that regard, the third lower leaf spring 5 is secured with its left end region on the lower ring-shaped bearing element 2 and with its right end region on the upper ring-shaped bearing element 1. On the other hand, the fourth lower leaf spring 6 is arranged or mounted with the left end region on the upper ring-shaped bearing element 1 and with the right end region on the lower ring-shaped bearing element 2.

Through the radial drive as well as through a swinging or pendulous motor or intermediate transmission bearing support, various different radial loads are introduced into the cross spring element, which can cause both a compressive as well as a tensile effect on the leaf springs 3, 4, 5, 6. In connection with a rotationally driven cross spring element, this already changes through the respective angular position relative to the force introduction location. Since such leaf springs 3, 4, 5, 6, as necessitated by the construction thereof, withstand much higher tensile loads than compressive loads, these are arranged pair-wise according to the invention and are secured alternately on both of the bearing elements 1, 2 which are embodied as bearing rings. Thereby, the leaf springs 3, 4, 5, 6 of a spring pair 3, 4; 5, 6 alternately are loaded both with radial tensile as well as compressive forces, so that each spring 3, 4, 5, 6 can be embodied preferably especially flat and therewith very flexurally soft in the rotation direction. Since these alternating securements or attachments are also provided on the lower cross-wise arranged leaf spring pair 5, 6, a uniform radial force distribution arises also in connection with a rotation, whereby a stable radial force bearing support is ensured.

Such a cross spring element is not only applicable or utilizable in rotating measuring branches, but rather can also be provided directly on a swinging or pendulously suspended drive motor. In that regard, one bearing ring 1 is then connected with the stator of the drive motor and the other bearing ring 2 is connected with a stationary device component, on which the force measuring apparatus is supported.

A preferred example embodiment of such a cross spring element is illustrated as a constructive embodiment in FIG. 2 of the drawing. Therein, the functionally equivalent components are provided with the same reference characters as in FIG. 1 of the drawing. This example embodiment in FIG.

2 of the drawing consists of two bearing elements 1, 2, which are embodied as structured or patterned ring elements. In that regard, both ring elements 1, 2 are rotatably spaced apart relative to one another in the axial direction by recesses and slits. In contrast to the schematic illustration according to FIG. 1 of the drawing, the spring pairs 3, 4; 5, 6 of one crosswise or transverse direction 8 are not directly next to one another, but instead in one case are separated by the crossing leaf spring pair of the other crosswise or transverse direction 8. The ring elements 1, 2 extend in the axial direction through projections and recesses 13 against or toward one another and in one another, whereby the interspaces are so provided that a contact is excluded or prevented even for a maximum rotational angle. In that regard, the projections or protrusions have axial surfaces 9, that are arranged radially and serve for the securing of the leaf spring end regions. The leaf springs 3, 4, 5, 6 are secured by a screw or bolt connection 10 on the ring elements 1, 2. The leaf springs 3, 4, 5, 6 consist of flat and thin spring material preferably a spring steel alloy, which comprises a high tensile strength. The ring elements 1, 2 preferably consist of a solid metal body, that has been machined from a pipe material by a chip-removing machining process or has been fabricated as a cast part.

Each of the two ring elements 1, 2 can still be provided with securing means on the connection rims or edges 11, so that it is connectable for example with toothed gear wheels, rotation axles, sleeves and other twisting or rotating elements, which shall be arranged to be twistable or rotatable relative to one another. The illustrated cross spring element is preferably provided for a mass flow measuring apparatus according to the Coriolis principle. Such cross spring elements are, however, also applicable or utilizable for other torque measuring apparatuses, for which, for example, the torque of a shaft, of a motor or the like is to be determined with a supported force measuring apparatus.

The invention claimed is:

1. Cross spring element for the connection of two relatively rotatable bearing elements (1, 2), that comprises at least two leaf spring elements (3, 4, 5, 6) which cross each other transversely to the rotation axis (7) and which connect both bearing elements (1, 2) with one another, characterized in that the mutually crossing leaf spring elements (3, 4; 5, 6) of one radial direction (8) are arranged at least pairwise, whereby the ends of each leaf spring pair (3, 4; 5, 6) on one side are respectively secured to different bearing elements (1, 2), and this alternately with the opposite side.

2. Cross spring element according to claim 1, characterized in that the bearing elements (1, 2) are embodied ringshaped and are connected with four pairwise crossing leaf springs (3, 4; 5, 6), whereby the leaf spring pairs (3, 4; 5, 6) cross themselves orthogonally.

3. Cross spring element according to claim 1, 2 characterized in that the leaf springs (3, 4, 5, 6) are arranged parallel next to one another in the direction of the rotation axis (7) and cross themselves on the rotation axis (7).

4. Cross spring element according to claim 2, characterized in that the ringshaped bearing elements (1, 2) comprise an outwardly directed planar connection rim (11) for the securing of a rotation element, and an inwardly stepped inner part (12) provided with projections and recesses (13), which engage into the oppositely lying bearing element (1, 2) and have at least axial surfaces (9) for the securing of the leaf spring ends.

5. Cross spring element according to claim 2, characterized in that the ringshaped bearing elements (1, 2) are axially spaced from one another by recesses (13) or slits, and permit at least a twisting or rotation angle of 5° up to 45°, and are connected through flat thin leaf springs (3, 4, 5, 6), whereby the leaf springs (3, 4, 5, 6) are flexurally soft in the rotation direction and flexurally hard in the tension direction.

6. Cross spring element according to claim 2, characterized in that the ringshaped bearing elements (1, 2) comprise securing means, with the aid of which this is rotatably supported between a drive unit and a force transducer, and serves for the frictionfree transmission of the drive moment that is to be measured.

7. Cross spring element according to claim 6, characterized in that this is arranged between a drive shaft of an impeller wheel and a force transducer of a bulk material mass flow measuring apparatus according to the Coriolis principle.

\* \* \* \* \*